United States Patent
Reason et al.

[11] Patent Number: 6,044,651
[45] Date of Patent: Apr. 4, 2000

[54] ECONOMY MODE FOR TRANSPORT REFRIGERATION UNITS

[75] Inventors: John Robert Reason, Liverpool; Joao Eduardo Navarro de Andrade, Cicero, both of N.Y.

[73] Assignee: Carrier Corporation, Farmington, Conn.

[21] Appl. No.: 09/277,470

[22] Filed: Mar. 26, 1999

[51] Int. Cl.[7] ............................................. F25B 49/02
[52] U.S. Cl. .......................... 62/161; 62/217; 62/225; 62/228.4; 62/228.5; 62/230; 62/158; 62/229
[58] Field of Search ..................... 62/230, 225, 228.4, 62/228.5, 229, 217, 125, 126, 127, 129, 161, 163, 157, 158, 231, 203, 204, 196.1, 196.2, 196.3

[56] References Cited

U.S. PATENT DOCUMENTS

| | | | |
|---|---|---|---|
| 4,134,272 | 1/1979 | Reimann | 62/115 |
| 4,735,055 | 4/1988 | Taylor et al. | 62/228.5 X |
| 4,903,495 | 2/1990 | Howland et al. | 62/81 |
| 5,067,556 | 11/1991 | Fudono et al. | 165/29 |
| 5,291,745 | 3/1994 | Hanson | 62/228.4 X |
| 5,546,756 | 8/1996 | Ali | 62/204 |
| 5,557,938 | 9/1996 | Hanson et al. | 62/230 X |
| 5,598,718 | 2/1997 | Freund et al. | 62/238.6 |
| 5,625,276 | 4/1997 | Scott et al. | 322/24 |
| 5,626,027 | 5/1997 | Dormer et al. | 62/175 |
| 5,628,205 | 5/1997 | Rockenfeller et al. | 62/480 |
| 5,661,378 | 8/1997 | Hapeman | 318/52 |
| 5,715,704 | 2/1998 | Cholkeri et al. | 62/527 |
| 5,771,703 | 6/1998 | Rajendran | 62/204 |
| 5,780,998 | 6/1998 | Scott et al. | 322/46 |
| 5,798,577 | 8/1998 | Lesesky et al. | 307/10.7 |
| 5,867,998 | 2/1999 | Guertin | 62/225 |

Primary Examiner—Harry B. Tanner
Attorney, Agent, or Firm—Niro, Scavone, Haller & Niro

[57] ABSTRACT

An process and method for monitoring and selectively implementing an operator selected economy mode in a transport refrigeration system is disclosed. The system includes a microprocessor control which, in response to operator selection of the economy mode, increases the base superheat setting, lowers the engine speed, limits the system current, and reduces the compressor capacity in order to optimize the fuel consumption of the system. The controller further monitors for the presence of an out of range alarm, and issues override commands reversing the superheat, compressor, current limit and engine speed economy mode settings at least until the out of range condition no longer exists.

6 Claims, 3 Drawing Sheets

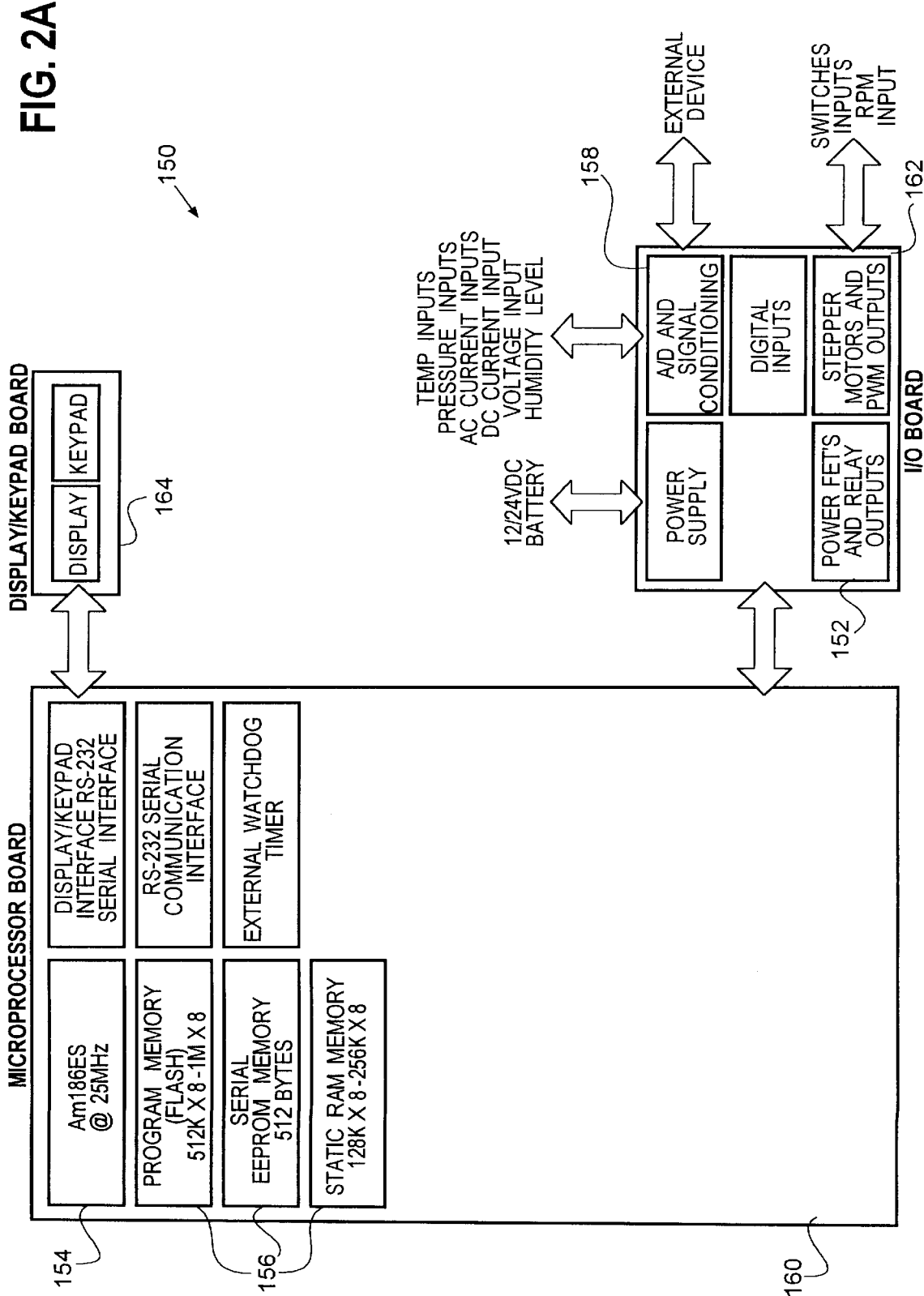

ECONOMY MODE FOR TRANSPORT REFRIGERATION UNITS

FIELD OF THE INVENTION

The field of the present invention relates to control systems for transport refrigeration systems. More specifically, the present invention is directed towards implementing a "economy mode" to conserve fuel consumption and increase efficiency in the event of partial load conditions.

DESCRIPTION OF THE PRIOR ART

A transport refrigeration system used to control enclosed areas, such as the box used on trucks, trailers, containers, or similar intermodal units, functions by absorbing heat from the enclosed area and releasing heat outside of the box into the environment. Transport refrigeration units can have a wide range of load requirements, ranging from −20° F. in the case of ice cream, 0° F. in the case of some frozen foods and 40° F. in the case of flowers and fresh fruit and vegetables. In addition, a trailer also has more than one compartment with loads having different temperature requirements. Additionally, the ambient temperatures encountered for such units may range from −20° F. or less to 130° F. or more.

Transport refrigeration that are designed to accommodate the full range of these operating conditions, while rugged, do not have the ability to be automatically configured so as to optimize fuel consumption and efficiency at moderate conditions. Currently available commercial designs, including those sold by assignee, have auto start/stop features which, while useful, do not offer the unit continuous operation capability, and do not offer optimum fuel consumption while the unit is actually operating.

The applicants have found that, in order to optimize fuel consumption under partial load conditions, it is desirable to maintain operation of the unit in an "economy mode," whereby the superheat setting in increased, the engine speed is limited and the compressor capability is limited by a controller.

SUMMARY OF THE INVENTION

The control method and process of this invention provides a refrigeration unit for a transport system having a controller for selectively implementing an "economy mode" whenever the unit is operating under partial load conditions. The process preferably includes a controller for implementing an operator selected "economy mode" wherein the controller adjusts the base superheat setting for the electronic expansion valve (the "EXV") by a fixed amount. The controller further issues control signals limiting the unit engine to low speed and further limiting the unit compressor to a maximum of four cylinders loaded (instead of its full capacity of six). The controller also issues a control signal reducing the current limit on the system by a fixed amount (preferably 3 amps) when the mode has been selected.

In a further preferred embodiment of the present invention, the controller utilizes an modified "off integrator" algorithm and implements a suction modulation valve ("SMV") minimum value. An off integrator algorithm, as is known in the art, is used to delay the compressor from cycling off after the the box temperature has reached the box set point for a preselected period of time (e.g., 500 degree-seconds). The modified off integrator algorithm results in a reduction in the delay prior to the compressor cycling off (preferably to about 50 degree-seconds), thus minimizing any unnecessary compressor operation after the set point has been reached. In addition, existing off integrator algorithm facilitates a gradual approach to the desired set point by severely restricting the SMV opening (preferably to an ultimate minimum value of 0.5% of its maximum opening. The control algorithm of the present invention, by contrast, has a much higher minimum SMV value (preferably, about 10%) thus facilitating a more rapid approach of the box temperature to its preselected set point. This feature, likewise, eliminates unnecessary operation time for the compressor.

In order to prevent load loss in the event the operating conditions become more extreme while the economy mode is in use, the present invention further includes an override feature programmed into the controller. In the event that the operator has programmed in the economy mode when maximum capacity is needed, the controller will issue control signals reversing the controls on the EXV, the engine speed, the compressor capacity, and the current limit in the event that an out of range alarm is activated. When such an alarm is activated, the controller will automatically override the "economy mode" controls until the unit is back in range.

Accordingly, one object of the present invention is to provide a microprocessor control for the regulation of transport refrigeration under partial load conditions.

It is a further object of the invention to provide a microprocessor control for implementing an operator selectable economy mode for automatically altering superheat settings, compressor capacity, engine speed, a compressor off integrator, minimum SMV values and current limit so as to better optimize fuel consumption and efficiency.

It is yet another object of the present invention to provide a controller for implementing an economy mode and an override for an economy mode so as to improve fuel consumption and efficiency without unnecessary risk of load loss.

These and other objects, features, and advantages of the present invention will become more apparent in light of the following detailed description of a best mode embodiment thereof, and as illustrated in the accompanying drawings.

BRIEF DESCRIPTION OF THE DRAWINGS

FIG. 2a shows a block schematic of a second preferred embodiment of a controller of the present invention.

DETAILED DESCRIPTION OF THE INVENTION

The invention that is the subject of the present application is one of a series of applications dealing with transport refrigeration system design and control, the other copending applications including: "Voltage Control Using Engine Speed"; "High Engine Coolant Temperature Control"; "Compressor Operating Envelope Management"; "Superheat Control for Optimum Capacity Under Power Limitation and Using a Suction Modulation Valve"; "Generator Power Management"; and "Electronic Expansion Valve Control Without Pressure Sensor Reading" all of which are assigned to the assignees of the present invention and which are hereby incorporated herein by reference. These inventions are most preferably designed for use in transportation refrigeration systems of the type described in copending applications entitled: "Transport Refrigeration Unit With Non-Synchronous Generator Power System;" Electrically Powered Trailer Refrigeration Unit With Integrally Mounted Diesel Driven Permanent Magnet Generator;" and "Transport Refrigeration Unit With Synchronous Generator Power System," each of which were invented by Robert Chopko, Kenneth Barrett, and James Wilson, and each of which were likewise assigned to the assignees of the present invention. The teachings and disclosures of these applications are likewise incorporated herein by reference.

Figure 1:
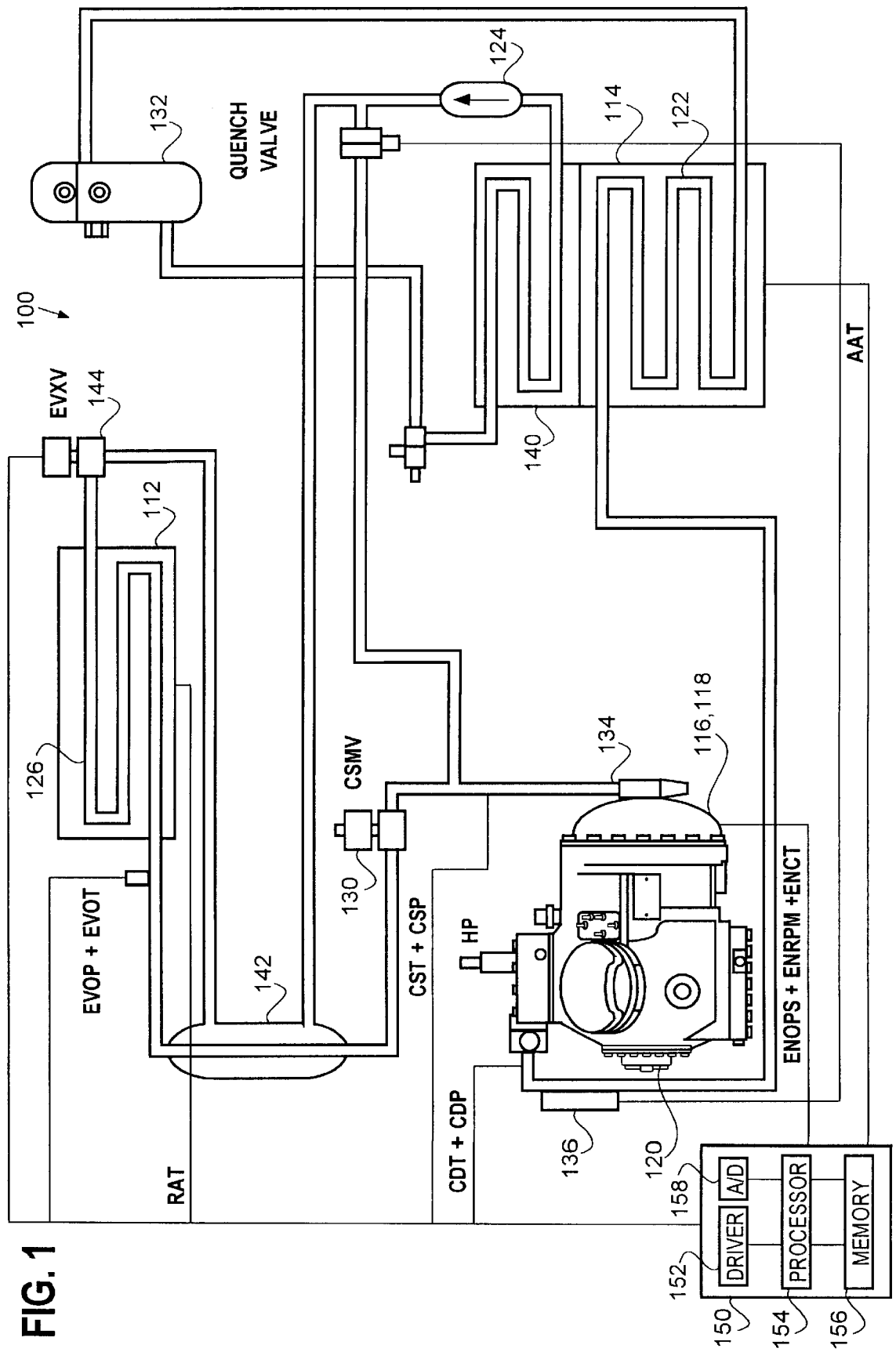
FIG. 1 shows a schematic of the transport refrigeration system of the present invention.

FIG. 1 illustrates a schematic representation of the transport refrigeration system 100 of the present invention. The refrigerant (which, in its most preferred embodiment is R404A) is used to cool the box air (i.e., the air within the container or trailer or truck) of the refrigeration transport system 100. is first compressed by a compressor 116, which is driven by a motor 118, which is most preferably an integrated electric drive motor driven by a synchronous generator (not shown) operating at low speed (most preferably 45 Hz) or high speed (most preferably 65 Hz). Another preferred embodiment of the present invention, however, provides for motor 118 to be a diesel engine, most preferably a four cylinder, 2200 cc displacement diesel engine which preferably operates at a high speed (about 1950 RPM) or at low speed (about 1350 RPM). The motor or engine 118 most preferably drives a 6 cylinder compressor 116 having a displacement of 600 cc, the compressor 116 further having two unloaders, each for selectively unloading a pair of cylinders under selective operating conditions. In the compressor, the (preferably vapor state) refrigerant is compressed to a higher temperature and pressure. The refrigerant then moves to the air-cooled condenser 114, which includes a plurality of condenser coil fins and tubes 122, which receiver air, typically blown by a condenser fan (not shown). By removing latent heat through this step, the refrigerant condenses to a high pressure/high temperature liquid and flow to a receiver 132 that provides storage for excess liquid refrigerant during low temperature operation. From the receiver 132, the refrigerant flows through subcooler unit 140, then to a filter-drier 124 which keeps the refrigerant clean and dry, and then to a heat exchanger 142, which increases the refrigerant subcooling.

Finally, the refrigerant flows to an electronic expansion valve 144 (the "EXV"). As the liquid refrigerant passes through the orifice of the EXV, at least some of it vaporizes. The refrigerant then flows through the tubes or coils 126 of the evaporator 112, which absorbs heat from the return air (i.e., air returning from the box) and in so doing, vaporizes the remaining liquid refrigerant. The return air is preferably drawn or pushed across the tubes or coils 126 by at least one evaporator fan (not shown). The refrigerant vapor is then drawn from the exhanger 112 through a suction modulation valve (or "SMV") back into the compressor.

Figure 2:
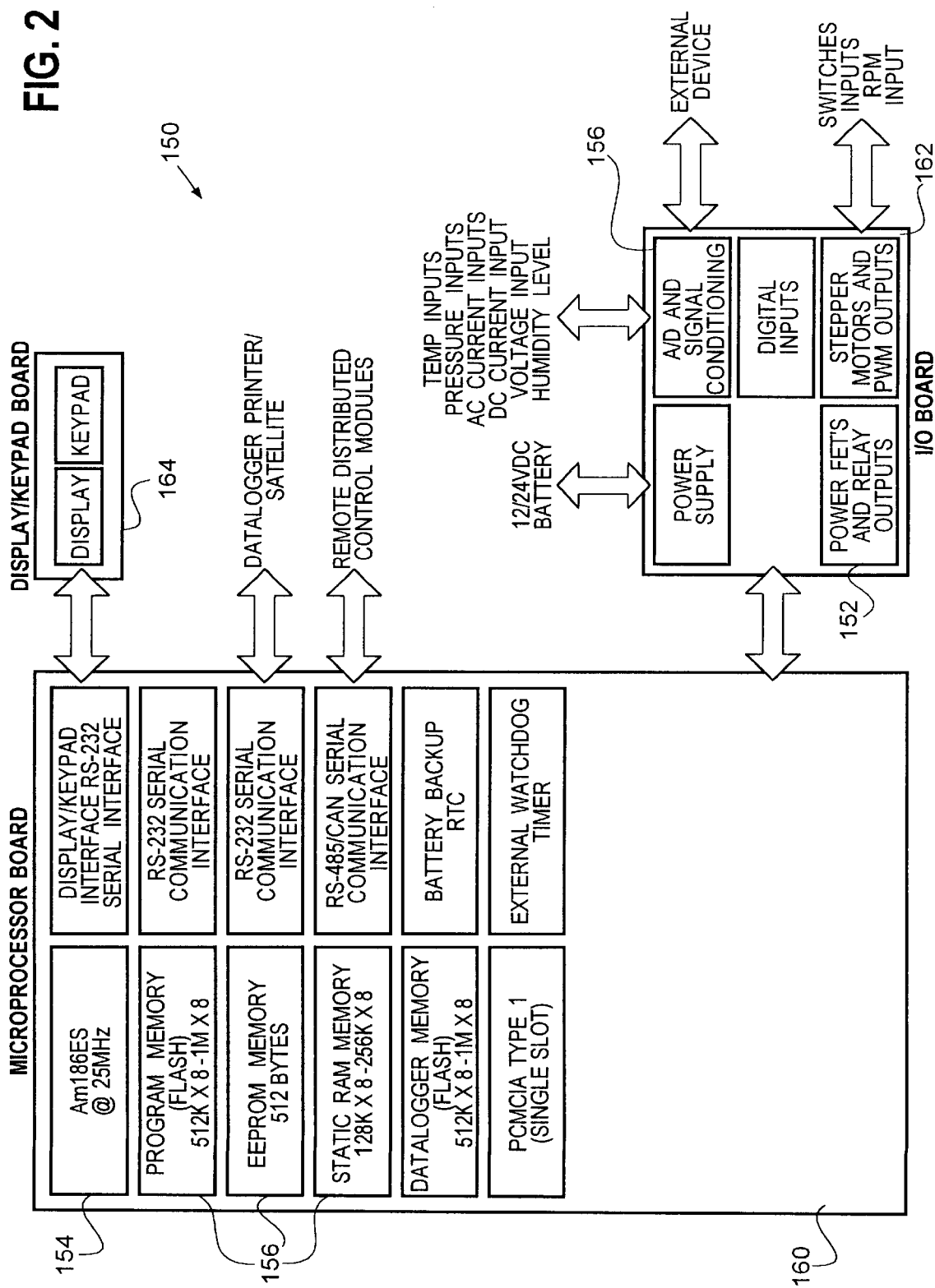
FIG. 2 shows a block schematic of a first preferred embodiment of a controller of the present invention.

Many of the points in the transport refrigeration system are monitored and controlled by a controller 150. As shown in FIGS. 2 and 2A Controller 150 preferably includes a microprocessor 154 and its associated memory 156. The memory 156 of controller 150 can contain operator or owner preselected, desired values for various operating parameters within the system, including, but not limited to temperature set point for various locations within the system 100 or the box, pressure limits, current limits, engine speed limits, and any variety of other desired operating parameters or limits with the system 100. Controller 150 most preferably includes a microprocessor board 160 that contains microprocessor 154 and memory 156, an input/output (I/O) board 162, which contains an analog to digital converter 156 which receives temperature inputs and pressure inputs from various points in the system, AC current inputs, DC current inputs, voltage inputs and humidity level inputs. In addition, I/O board 162 includes drive circuits or field effect transistors ("FETs") and relays which receive signals or current from the controller 150 and in turn control various external or peripheral devices in the system 100, such as SMV 130, EXV 144 and the speed of engine 118 through a solenoid (not shown).

Among the specific sensors and transducers most preferably monitored by controller 150 includes: the return air temperature (RAT) sensor which inputs into the processor 154 a variable resistor value according to the evaporator return air temperature; the ambient air temperature (AAT) which inputs into microprocessor 154 a variable resistor value according to the ambient air temperature read in front of the condenser 114; the compressor suction temperature (CST) sensor; which inputs to the microprocessor a variable resistor value according to the compressor suction temperature; the compressor discharge temperature (CDT) sensor, which inputs to microprocessor 154 a resistor value according to the compressor discharge temperature inside the cylinder head of compressor 116; the evaporator outlet temperature (EVOT) sensor, which inputs to microprocessor 154 a variable resistor value according to the outlet temperature of evaporator 112; the generator temperature (GENT) sensor, which inputs to microprocessor 154 a resistor value according to the generator temperature; the engine coolant temperature (ENCT) sensor, which inputs to microprocessor 154 a variable resistor value according to the engine coolant temperature of engine 118; the compressor suction pressure (CSP) transducer, which inputs to microprocessor 154 a variable voltage according to the compressor suction value of compressor 116; the compressor discharge pressure (CDP) transducer, which inputs to microprocessor 154 a variable voltage according to the compressor discharge value of compressor 116; the evaporator outlet pressure (EVOP) transducer which inputs to microprocessor 154 a variable voltage according to the evaporator outlet pressure or evaporator 112; the engine oil pressure switch (ENOPS), which inputs to microprocessor 154 an engine oil pressure value from engine 118; direct current and alternating current sensors (CT1 and CT2, respectively), which input to microprocessor 154 a variable voltage values corresponding to the current drawn by the system 100 and an engine RPM (ENRPM) transducer, which inputs to microprocessor 154 a variable frequency according to the engine RPM of engine 118.

The benefits of the present invention are realized when the operator selects the "Economy Mode" option through use of the Keypad 164. The controller 150, upon receiving this input, increases the base superheat setting for EXV 144 by a fixed amount. This parameter is configurable by those of skill in the art and can be adjusted depending upon the nature and extent of the partial load. In addition, the selection of "Economy Mode" results in controller 150 issuing control signals to engine 118 setting it in low speed and to compressor 116 limiting it to a maximum of 4 cylinders or 2 cylinder banks loaded. Controller 150 further reduced the current limit by a predetermined amount (e.g., 3 amps). In order to prevent load loss, controller 150 monitors for any sensor or transducer reading that would result in an out of range alarm. In that event, controller 150 will automatically override all "Economy Mode" commands and conditions as described above until the system 100 is back in range.

In a further preferred embodiment of the present invention, processor 154 of controller 150 utilizes a modified "off integrator" algorithm and implements a suction modulation valve ("SMV") minimum value position. This algorithm, which compares the RAT value with a preselected set point stored in memory 156, provides a limited period (preferably to about 50 degree-seconds) prior to issuing a control signal shutting down compressor 116, thus minimizing any unnecessary compressor operation after the set point has been reached. This period is believed to be significantly smaller than delay period for off integrators currently available. In addition, the modified algorithm employed by controller 150 limits the maximum closure of SMV 130 during economy mode to about 10% of its maximum opening (normally, the minimum value set in memory is about 0.5%). The increased minimum flow rate resulting from the higher minimum SMV opening facilitates a more rapid convergence of the box temperature ("RAT") and its preselected set point stored in memory 156. This feature, likewise, eliminates unnecessary operation time for the compressor, thus resulting in further fuel savings.

It will be appreciated by those skilled in the art that various changes, additions, omissions, and modifications can be made to the illustrated embodiments without departing from the spirit of the present invention. All such modifications and changes are intended to be covered by the following claims.

We claim:

1. A process for reducing fuel consumption in a transport refrigeration unit under partial load conditions, said process comprising the steps of:

i increasing the desired superheat setting, thereby restricting the electronic expansion valve so as to decrease the mass flow of the refrigeration unit;

ii lowering the current limit of said refrigeration unit to a predetermined set point;

iii energizing a unloader so as to lower the displacement of the compressor;

iv limiting the engine to low speed; and v selectively overriding said superheat setting, removing the restriction of said current limit to said predetermined set point, deenergizing said loader, and removing the limit to said low engine speed in the event of an out of range alarm.

2. A process for reducing fuel consumption in a transport refrigeration unit under partial load conditions, said process comprising the steps of:

i increasing the desired superheat setting, thereby restricting the electronic expansion valve so as to decrease the mass flow of the refrigeration unit;

ii lowering the current limit of said refrigeration unit to a predetermined set point;

iii energizing a unloader so as to lower the displacement of the compressor;

iv limiting the engine to low speed; and v selectively deenergizing said unloader in the event of an out of range alarm;

vi monitoring for the presence of a continuing out of range alarm.

3. The process of claim 2, comprising the further step of selectively overriding said superheat setting in the event of a continuing out of range alarm.

4. The process of claim 3, comprising the further step of selectively overriding said lowered engine speed in the event of a continuing out of range alarm.

5. The process of claim 4, comprising the further steps of polling for the continued presence of said out of range alarm, and eliminating said overrides in the absence of an out of range alarm.

6. A process for reducing fuel consumption in a transport refrigeration unit under partial load conditions, said process comprising the steps of:

i decreasing the period delay for shutting down the compressor after the box temperature has reached a preselected limit; and ii raising the minimum opening value for the suction modulation valve, thereby facilitating a more rapid convergence of the box temperature and a preselected, desired box temperature set point.

* * * * *